(12) United States Patent
Mohindra

(10) Patent No.: US 7,035,341 B2
(45) Date of Patent: Apr. 25, 2006

(54) QUADRATURE GAIN AND PHASE IMBALANCE CORRECTION IN A RECEIVER

(75) Inventor: Rishi Mohindra, Milpitas, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 373 days.

(21) Appl. No.: 10/285,151

(22) Filed: Nov. 1, 2002

(65) Prior Publication Data

US 2003/0053563 A1    Mar. 20, 2003

Related U.S. Application Data

(63) Continuation-in-part of application No. 09/927,762, filed on Aug. 10, 2001.

(51) Int. Cl.
*H04L 5/12* (2006.01)
(52) U.S. Cl. .................................... 375/261
(58) Field of Classification Search ........ 375/371–376, 375/322, 316; 329/358–360, 356; 455/255, 455/260, 46, 202; 332/167
See application file for complete search history.

(56) References Cited

U.S. PATENT DOCUMENTS

| | | | |
|---|---|---|---|
| 3,937,882 A * | 2/1976 | Bingham | 370/276 |
| 4,122,448 A | 10/1978 | Martin | |
| 5,396,656 A | 3/1995 | Jasper et al. | |
| 5,949,821 A * | 9/1999 | Emami et al. | 375/235 |
| 6,009,317 A * | 12/1999 | Wynn | 455/296 |
| 6,330,290 B1 * | 12/2001 | Glas | 375/324 |
| 6,618,096 B1 * | 9/2003 | Stapleton | 348/608 |
| 6,744,829 B1 * | 6/2004 | Mohindra | 375/343 |
| 6,940,916 B1 * | 9/2005 | Warner et al. | 375/261 |
| 2003/0165203 A1 * | 9/2003 | Mohindra | 375/324 |

* cited by examiner

*Primary Examiner*—Robert Pascal
*Assistant Examiner*—Krista M. Flanagan
(74) *Attorney, Agent, or Firm*—Perkins Coie LLP (57) ABSTRACT

The present invention utilizes circuitry, already present in receivers, to calibrate and correct for gain and phase errors in a transceiver device. The present invention employs a digital signal processor along with multiple phase shifters and all pass networks to ensure proper levels of quadrature signals within the transceiver. An internally generated double sideband suppressed carrier signal is created to produce the calibration signals used by the digital signal processor.

19 Claims, 5 Drawing Sheets

QUADRATURE GAIN AND PHASE IMBALANCE CORRECTION IN A RECEIVER

CROSS REFERENCE TO RELATED APPLICATIONS

This application is a continuation in part of currently pending U.S. application Ser. No. 09/927,762 filed Aug. 10, 2001, which is herein incorporated by reference.

STATEMENT REGARDING FEDERALLY SPONSORED RESEARCH

None

BACKGROUND OF THE INVENTION

The invention relates to a method for correcting the gain and phase imbalance in quadrature paths of a receiver.

In radio communication systems, different types of modulation schemes are employed to minimize the frequency spectrum necessary for communication and thereby maximize the call capacity of the radio communication system. The modulation schemes utilized usually involve converting the communication signal into discrete form, and the resultant modulated signal is typically of a reduced frequency spectrum.

One method of transmitting a communication signal in discrete form is through the use of quadrature modulation. In quadrature modulation, the binary data stream of the encoded communication signal is separated into bit pairs. Such bit pairs are utilized to cause phase shifts of the RF carrier signal in increments such as plus or minus $\pi/4$ radians or plus or minus $3\pi/4$ radians, according to the values of the individual bit pairs of the encoded signal.

The phase shifts are effectuated by applying the binary data stream comprised of the bit pairs to a pair of mixer circuits. A sine component of a carrier signal is applied to an input of a first mixer circuit, and a cosine component of a carrier signal is applied to an input of a second mixer circuit. The sine and cosine components of the carrier signal are in a relative phase relationship of ninety degrees with one another, or phase quadrature. A quadrature generator is utilized to generate and apply the sine and cosine components of the carrier signal to the first and second mixer circuits of the pair of mixer circuits, respectively. This produces what is reffered to as in-phase "I" and quadrature "Q" signals. These I and Q signals are then filtered and gain adjusted and finally sent to a Digital Signal Processing chip to extract the communicated data.

There are two major sources of I and Q signal errors in this type of receiver. First, I and Q gain and phase errors result from the down conversion to base band or intermediate frequency IF cause by the mixing circuits. Second, frequency dependent I and Q gain and phase error variations result within the pass band of the channel filters. These types of errors are due to gain and phase mismatches between the quadrature receiver paths after down conversion (e.g. between the I and Q low pass filters and between the I and Q gain control blocks). Therefore the IQ errors that need to be calibrated and corrected are; a) IQ gain errors (combined systematic and frequency dependent), b) systematic IQ phase errors, and c) frequency dependent IQ phase errors.

The prior art has used higher tolerance components in an attempt to avoid phase and/or amplitude imbalances between the I and Q components. Such an approach has significant cost impact and may still not adequately address the problem. Other prior art approaches attempt to account for imbalances by estimating and removing these errors.

Figure 1:
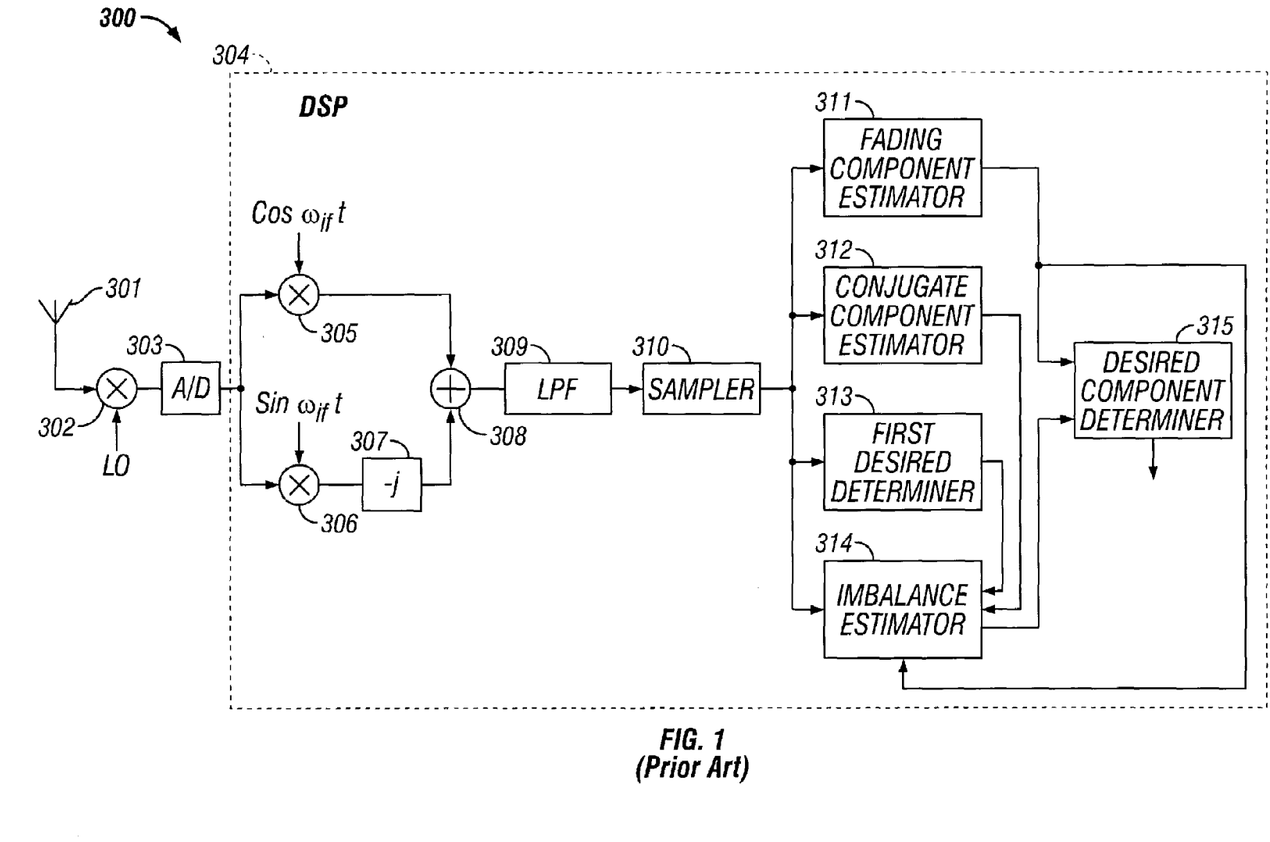
FIG. 1 shows a Prior Art quadrature imbalance correction circuit.

One such approach is described in U.S. Pat. No. 5,396,656 issued on Mar. 7, 1995, to Jasper et al., for a Method For Determining Desired Components Of Quadrature Modulated Signals. This is shown in Prior Art FIG. 1. Here, a closed loop feedback technique is used to continuously determine an error signal by updating estimates of an imbalance component until the magnitude of the error signal is negligible. This prior art circuit contains standard components such as an antenna 301, a local oscillator 302, an A/D converter 303, and a Digital Signal Processing chip 304. The DSP 304 includes mixing circuits 305 and 306 and a phase shifter 307. The signals are then summed by adder 308 and then low pass filtered by element 309. The signal is then sampled by sampler 310, where the magnitudes of the components are estimated and the imbalance of the I and Q signals are determined by elements 311–314. The final error correction process is then accomplished by the desired component determiner 315 used in conjunction with the DSP. The drawback of this technique is that all these feedback components (310–315) must be supplied in addition to the already required components found in I and Q receivers. This adversely effects the cost and complexity of the device. Further, even with all these extra circuit elements, adequate error compensation is not fully realized.

Thus, conventional I and Q correction circuits rely on providing additional components for the minimization of errors. Other corrective devices such as a separate PLL and VCO are too costly to provide additionally. Therefore a solution is required that takes into account all the above mentioned problems and limitations associated with quadrature imbalance correction circuits without requiring additional expensive circuitry.

SUMMARY OF THE INVENTION

The present invention generates a receiver calibration signal used to measure these errors common to IQ receivers. The present invention then corrects the errors determined in the calibration mode. Specifically, the gain errors of the I and Q signals are calibrated and corrected. The systematic phase errors of the I and Q branches are calibrated and corrected. Also the frequency dependent phase errors are calibrated and corrected.

In order to accomplish the above goals, the invention employs a digital signal processor to control the calibration and correction processes. One embodiment of the present invention includes an IQ circuit containing mixers, filters and gain controlling devices. This embodiment further includes multipliers and phase shifters that are used in conjunction with the DSP to determine the phase error between the I and Q components. The present invention further prodives several embodiments for each type of error calibration and correction. For example, the systematic phase errors may be corrected using a look-up table or they may be corrected iteratively by the digital signal processor. The frequency dependent phase errors may also be corrected using phase shifters or an all-pass network.

Therefore the present invention offers a low cost, reliable, on chip implementation that takes advantage of circuitry already present to detect and correct for all the different types of errors found in IQ quadrature receiver circuits.

DETAILED DESCRIPTION OF THE INVENTION

Figure 2:
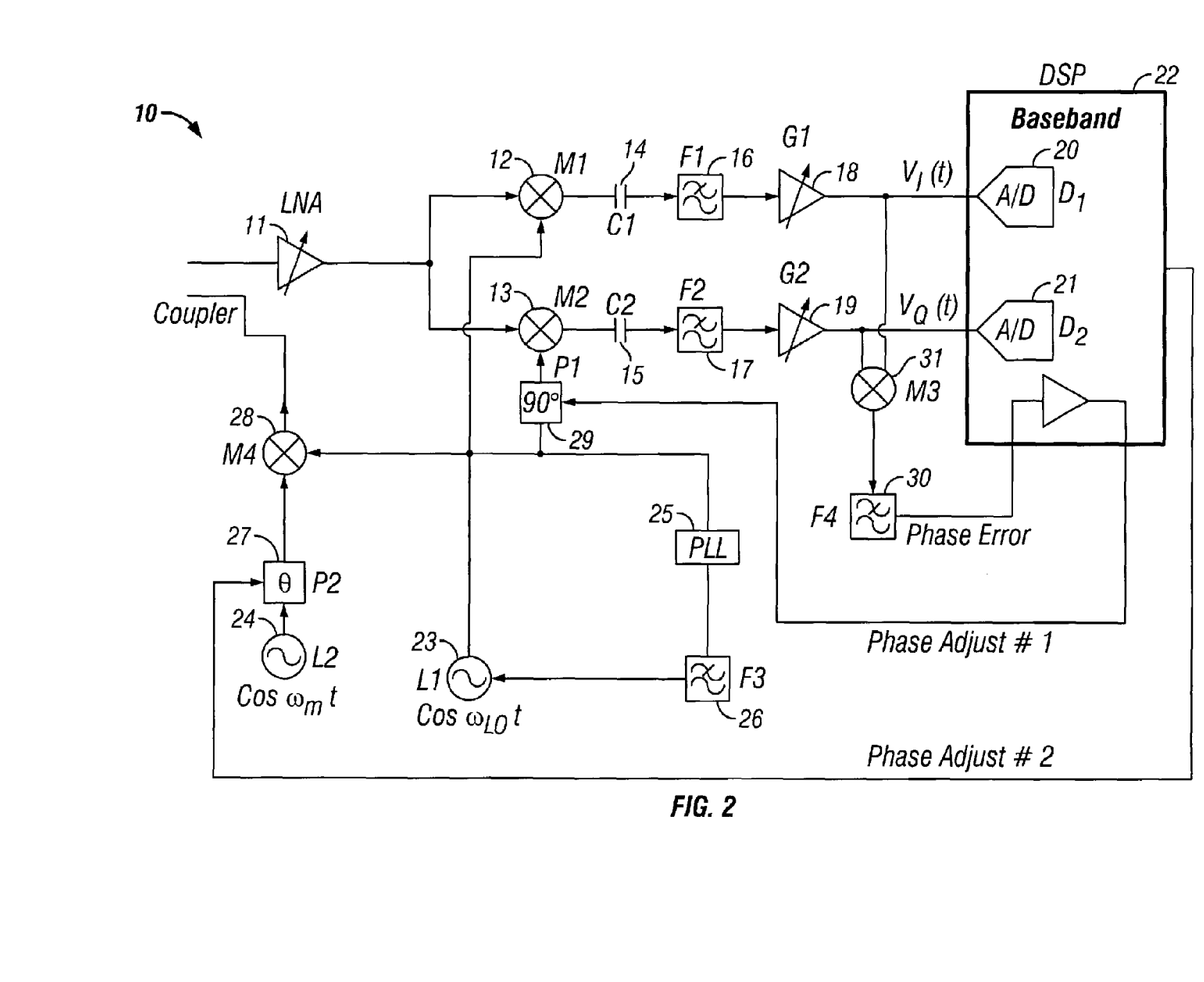
FIG. 2 shows a circuit of the present invention.

FIG. 2 shows one of the preferred embodiments of the present invention. FIG. 2 illustrates a communications device 10 suitable for receiving and correcting I and Q (In phase and Quadrature phase) signals. There are two essential parts to the device 10, the path of the received signals and the signal path of the signals used to mix with the received signals. In this embodiment the received signal path includes a low noise amplifier 11, two mixers 12 and 13, two coupling capacitors 14 and 15 and two filters 16 and 17. Finally the signal path contains gain amplifiers 18 and 19 before the received signal is input into A/D converters 20 and 21 for processing by the digital signal processor 22. The mixing signals are produced using local oscillators 23 and 24, a phase locked loop 25, a filter 26, a phase shifter 27 and a mixer 28.

In the received signal path, the LNA1 (11) is a standard low noise amplifier commonly used to amplify low power high frequency RF signals. The incoming radio signal into LNA1 comes from an antenna not shown. The received signal will be broken into quadrature components by using mixing circuits M1 (12) and M2 (13) and phase adjusting circuit P1 (29). The outputs of M1 and M2 will become the baseband signals. For example, if the incoming signal has a bandwidth of 20 MHz, each of the I and Q branches will be signals of 10 MHz bandwidth. As is conventional in quadrature circuits, capacitors C1 and C2 (14 and 15) are used to block any dc component of received signal and filters F1 and F2 (16 and 17) are used to further filter unwanted signals. Before any quadrature modulation is performed however, it is critical that the receiver be properly calibrated.

In order to produce a reliable calibration tone in the mixing signal path, the local oscillator L1 (23) is mixed with a low frequency tone produced by L2 (24). An example of these frequencies would be L1 set at 5 Gigahertz, while L2 is set at 5 Megahertz. The local oscillator L1 is also used with a Phase Locked Loop PLL (25) and a filter F3 (26). These two signals are multiplied by a mixing circuit M4 (28). The resulting multiplication of two sine waves of differing frequencies results in two signals being produced, wherein the resulting sine wave are at different frequencies. For example cos(A)×cos(B)=cos(A+B)+cos(A−B). Therefore the mixer M4 produces two signals for the calibration process. As mentioned previously, prior art methods do not employ circuitry nor signals of this type for the calibration signal generators. Standard prior art methods employ only one tone for calibration purposes whereas the instant invention uses two. In this example the frequencies are 5 GHz+5 MHz and 5 GHz−5 MHz. It is noted that this Double Side-Band Suppressed Carrier signal (DSBSC) may be coupled in the receiver's RF path at either the LNA input or the LNA output.

The two calibration tones will be fed into Mixers M1 and M2 for quadrature processing. Using two tones for calibration however, would pose a problem for prior art circuits. In this scenario the In-phase branch would be a clear signal but the Quadrature phase would be zero. In order to overcome this problem a Phase Shifter P2 is implemented. The phase shifter P2 adds an angle theta to the frequency of a calibration tone signal. For example, when P2 is set to zero, VI(t) is cos(wt) and VQ(t) is zero. When P2 is set to 90 degrees; the VI(t) signal is nonexistent while VQ(t) is cos(wt).

The calibration process using Phase Shifter P2 (27) would then be as follows. P2 is adjusted so as to obtain the maximum value of signal in the VI(t) branch. The adjustment of P2 is performed by the Digital Signal Processor (22). The maximum signal level is measured by digital signal processor 22 and stored. Then P2 is adjusted by 90 degrees until the signal in the Q branch is at a maximum level. The maximum level of the Q branch is also measured and stored in the digital signal processor 22. Once these maximum values of each branch are known, the digital signal processor 22 may perform a gain imbalance calibration. This gain imbalance correction may be performed by amplifiers G1 and G2 (18 and 19) or after analog to digital signal conversion (A/D) in the digital signal processor 22. It is noted that G1 and G2 may perform the gain adjustments for the receiver as a whole. It is also noted that G1 and G2 are controlled together as opposed to separately. The I and Q gains are therefore made equal to avoid any sideband production and distortion of the desired signal. The present invention also allows for gain imbalance calibration to be performed at any level of gain as set by G1 and G2.

With respect to the IQ phase error calibration, P2 would be set at a value such as 45 degrees. This ensures a signal in both the I and Q branches of almost equal value. By simply multiplying the two signals together one can detect the relative phase of the I and Q branches. The product of a sine and cosine signal should result in zero. Mixer circuit M3 (31) accomplishes the multiplication of the I and Q signals and outputs this signal to a filter F4 (30). If this is not the case, meaning that the I and Q branches are not exactly 90 degrees out of phase as desired, a phase error signal is produced. This signal is fed back through an amplifier to Phase Shifter P1 that will compensate for the error. Ideally the phase difference between the I and Q branches should be 90 degrees. Therefore, the adjustment of P2 with the appropriate gain control in addition with the adjustment of P1, allow for an optimum phase imbalance to be performed. It is noted that P1 may be in the RF path instead of being in the local oscillator path if desired.

In a second embodiment, the phase shifter P2 may be used in another manner than the one described above. In this embodiment, the phase shifter is constantly varying the angle of shift. For example, theta starts at zero and constantly increases. While the amount of phase shift varies, the in-phase and quadrature signals will vary in amplitude. At some values of theta both signals are present, while other values of theta result in only one of the two signals being present. As in the previous embodiment, the peak amplitudes of each of the in-phase and quadrature signals are measured by the digital signal processor 22. This allows another way to detect the maximum amplitudes needed for gain compensation.

Figure 3:
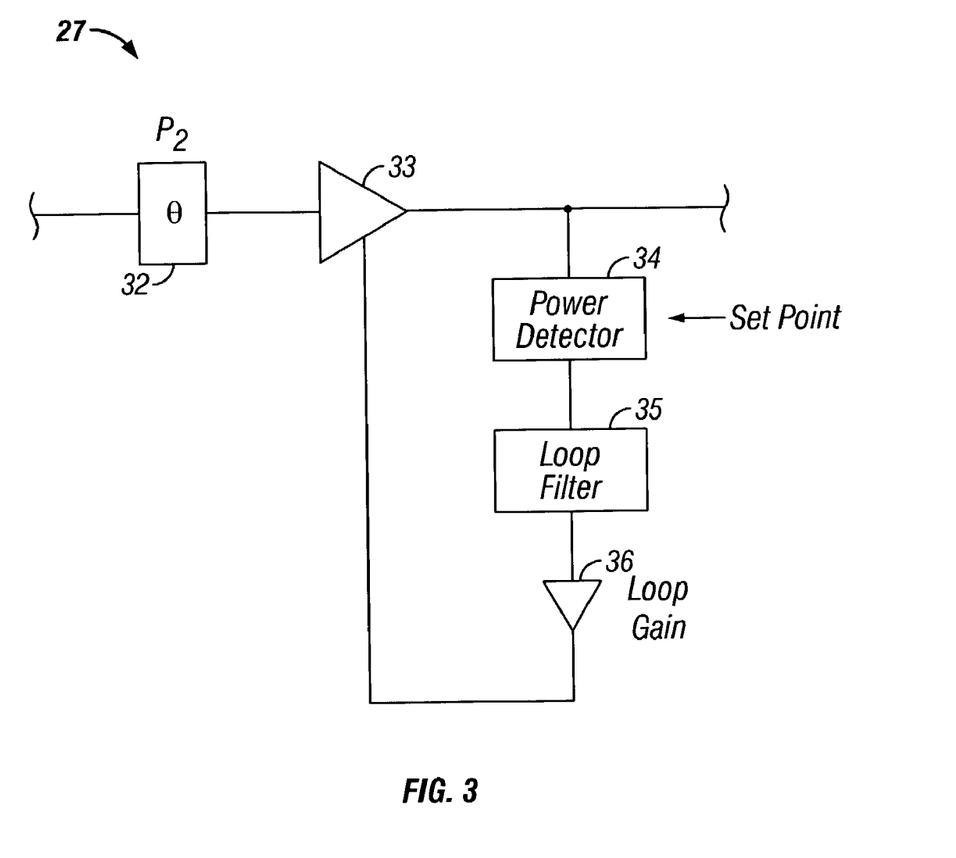
FIG. 3 shows the phase shifter P2 as shown in FIG. 2.

FIG. 3 of the present invention shows one embodiment of how P2 the Phase Shifter 27 (as shown in FIG. 2) may be implemented. In addition to the actual phase shifting device 32, this expanded view of the phase shifter 27 contains the follwing elements, an amplifier 33, and a feedback loop comprising a power detector 34, a loop filter 35 and a loop gain amplifier 36. Given that the amplitudes of the signals involved in the calibration process are critical, it is important that P2 does not modify the signal strength of the signal that it is shifting. Therefore it must be ensured that P2 will not provide gain or loss to the signal for any range of shift in degrees. In the present invention, the output of P2 has a constant amplitude independent of the phase shift. A limited or automatic gain control device would be used to ensure his constant output voltage level. FIG. 3 shows the use of a power detector (34) that determines the power of the calibration signal. This detected power is compared to a set point value. If the signal is somewhat off the desired set point level, an error signal may be generated to compensate for this fact. A loop filter (35) and loop gain amplifier (36) help keep the output of the circuit constant for all phase shifts. This allows P2 to output a constant signal amplitude as desired and not adversely effect the calibration process.

Figure 4:
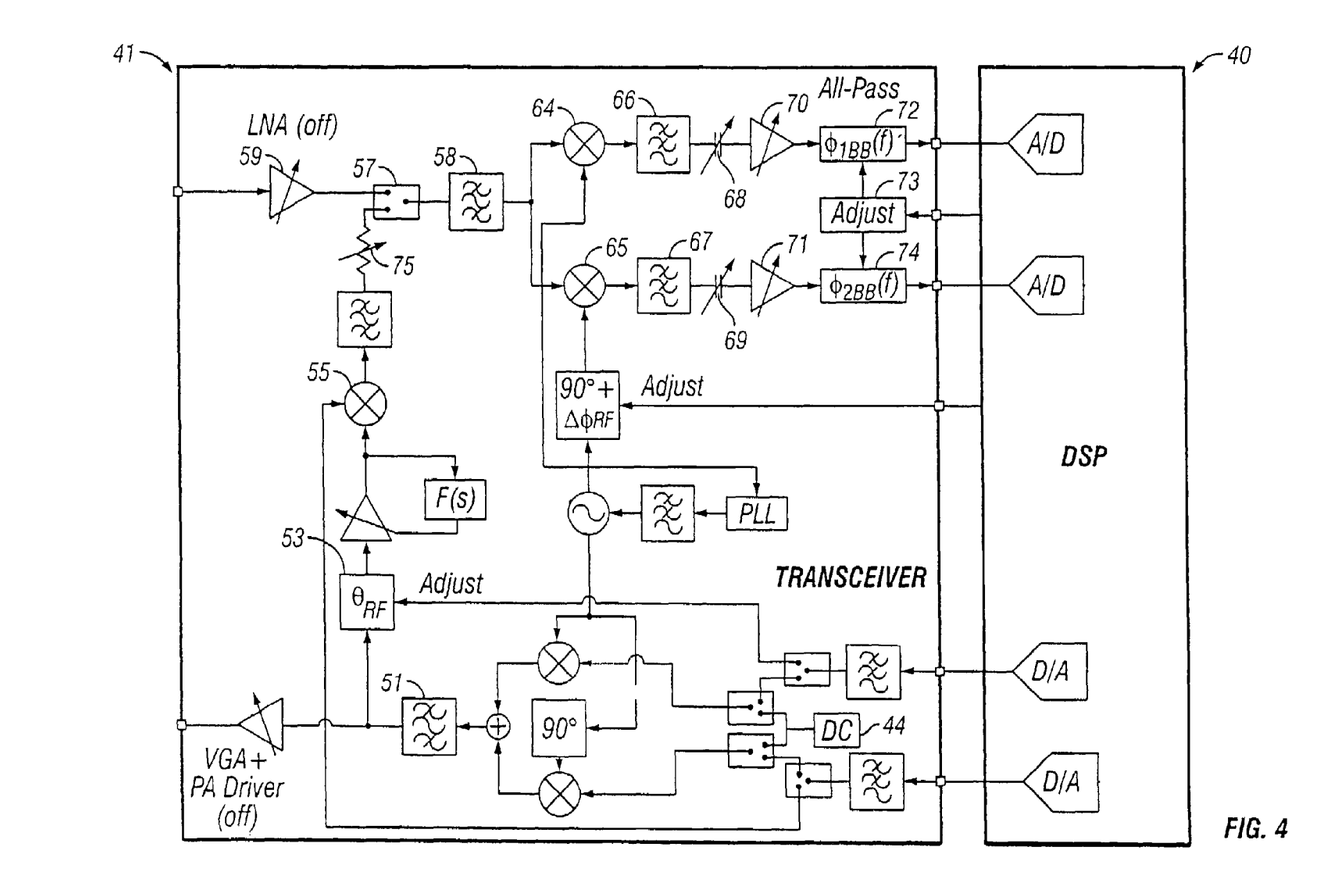
FIG. 4 shows another embodiment of the present invention.

In another preferred embodiment of the present invention, the systematic and frequency dependent IQ gain and phase errors in the receiver are calibrated using the circuit as shown in FIG. 4.

The transceiver in FIG. 4 is similar to that shown in FIG. 2. There is both a received signal path and a mixing/calibration signal generating path. In the received signal path the signal is first sent through a Low Noise Amplifier (LNA) 59. After passing through the LNA, the signal is coupled by a switch 57 to a bandpass filter 58. Down converters 64 and 65 further process the signal to create the I and Q branches as is conventional. The I and Q signals are then filtered and amplified by elements 66,67, 70 and 71. Variable capacitors 68 and 69 serve to AC couple the signal in what is known as the automatic gain control portion of the receiver. All pass networks 72 and 74 are adjusted by a signal 73 from the DSP to ensure proper phase relationships between the I and Q branches. The operation and control of the all-pass networks exemplifies one embodiment of the phase error correction method and apparatus which will be described in more detail below.

For the calibration process an RF tone is generated by the DSP 40 in the transmitter path at the center frequency of the receiver pass band. This is done by applying a DC signal from generator 44, to the base band I and Q modulation inputs of the transmitter. This RF tone is passed through a bandpass filter 51, a DSB-SC phase shifter 53, and then multiplied by a sine wave in multiplier 55 at a low frequency of F.sub.BB. This produces a DSB-SC (double side band, suppressed carrier) modulated signal. F.sub.BB is the base band frequency of interest at which the receiver's frequency dependent IQ error calibration is being done. For the frequency dependent IQ error, F.sub.BB ranges from 0 Hz to about 8.5 MHz in an IEEE802.11a WLAN transceiver. The DSB-SC phase shifter 53, sometimes referred to as an RF phase shifter, effectively changes the phase of the suppressed carrier of the DSB-SC modulated signal. A variable gain control amplifier configuration 54 ensures that the DSB-SC phase shifter 53 does not change the signal levels.

The DSB-SC calibration signal generated by the DSP is then coupled into the receiver path before the down conversion by coupling switch 57. After down conversion to base band frequencies and low-pass filtering, the receiver I and Q output signals are at a frequency of $F_{BB}$. This is because the local oscillator frequency for the transmitter and the receiver are kept equal.

The transmitter RF tone is $\sin(\omega_{RF} \cdot t)$ and it is mixed with a base band modulation tone $\sin(\omega_{BB} \cdot t)$. After multiplication in mixer (55), the DSB-SC modulated signal is $\sin(\omega_{RF} \cdot t) \cdot \sin(\omega_{BB} \cdot t)$. After this, the DSB-SC signal is injected into the receiver RF path by switch 57, down converted to I and Q base band frequencies, low-pass filtered, and then it appears at the receiver output with all the above mentioned IQ errors. Equations 1 and 2 describe the I and Q branch signals found in the circuit of FIG. 4 with the errors contained therein.

$$I(t)=A \cdot (1+\Delta G/2) \cdot \sin(\omega_{BB} \cdot t + \Delta\phi_{BB}/2) \cdot \cos(\theta_{RF}) \quad \text{[Eqn. 1]}$$

$$Q(t)=A \cdot (1-\Delta G/2) \cdot \sin(\omega_{BB} \cdot t - \Delta\phi_{BB}/2) \cdot \sin(\theta_{RF}-\Delta\phi_{RF}) \quad \text{[Eqn. 2]}$$

Where
A=constant
$\Delta G$=IQ gain imbalance in the receiver at $F_{BB}$ (includes both systematic and frequency dependent)
$\Delta\phi_{BB}$=frequency dependent base band IQ phase error in the receiver, at frequency $F_{BB}$
$\theta_{RF}$=total (adjustable) RF phase shift in the calibration tone path prior to injection into receiver
$\Delta\phi_{RF}$=systematic IQ phase error in the receiver
$\omega_{BB}=2\pi F_{BB}$ If the receiver base band IQ output is DC-coupled to the A/D of the DSP chip 40, the DC offset errors also have to be removed. This DC error can be estimated by averaging the I and Q signals over a period that is an exact multiple of $1/F_{BB}$. When AC coupling is employed during calibration, the lower −3 dB frequency is kept at least 10 times smaller than $F_{BB}$ in order to ensure that any asymmetry in the frequency roll-off between the I and Q paths doesn't impact the IQ gain error. Therefore, in order to enact other subsequently described embodiments of the present invention, a DC error must be removed before proceeding with the IQ Gain Error Calibration.

The DSP 40 will use equations 1 and 2 as listed above, in order to implement it's error correction process. For IQ gain imbalance calibration, the DSP 40 adjusts the DSB-SC phase shifter 53 so that the I-branch has maximum signal. In this case $\cos(\theta_{RF})=1$ i.e. $\theta_{RF}=0$. After accurately measuring the rms signal level in the I-branch, the DSB-SC phase shifter 53 is stepped by 90 degrees and finely adjusted to get the maximum level in the Q-branch. In this case $\sin(\theta_{RF}-\Delta\phi_{RF})=1$ i.e. $\theta_{RF}=\pi/2+\Delta\phi_{RF}$. The Q-branch signal is then measured by the DSP 40. The relative IQ gain imbalance at $F_{BB}$ is the ratio of these two rms signal levels.

The systematic IQ gain imbalance may be measured by the DSP 40 by keeping the frequency $F_{BB}$ at a very small value. In some cases, the average gain imbalance over the pass band (e.g. over 0 to 8 MHz for IEEE802.11a) may also be considered. The IQ gain imbalance is corrected in the DSP chip in real time after the A/D conversion. This is accomplished by relatively scaling the I and Q gain in time domain (independent of pass band frequency). After this correction, the $\Delta G$ term in equations 1 and 2 becomes negligible.

The IQ gain error calibration needs to be done over the gain range of the receiver if the error varies significantly with gain. In order not to overload the receiver, the level of the DSB-SC tone injected into the receiver must decrease with increasing gain of the base band gain control. Therefore a programmable attenuator (75) is required in the path of the DSB-SC signal. This can be done at the RF frequencies, but better still at the base band, i.e. the amplitude of the base band modulation signal $\cos(\omega_{BB} \cdot t)$ or $\sin(\omega_{BB} \cdot t)$ can be attenuated. However, when this amplitude gets small, the direct leakage of the unmodulated RF tone through the mixer can get significant and even become larger than the DSB-SC signal. Fortunately, with AC coupling in the receiver (capacitors 68 and 69), this unmodulated tone that gets down converted to 0 Hz, gets removed. This ensures that the receiver base band paths are not overloaded or saturated.

Therefore once the gain is calibrated and corrected by the DSP 40, a systematic IQ phase error calibration may be performed in another embodiment of the present invention.

Using the following technique, the IQ systematic phase error calibration is not influenced by the choice of $F_{BB}$ in the pass band i.e. $F_{BB}$ does not have to be close to 0 Hz. A suitable $F_{BB}$ is chosen by the DSP 40 (say at half the maximum pass band frequency of the low-pass filters 66 and 67), and the IQ gain calibration is first done at that frequency using the previously defined method.

The IQ gain calibrated signals are:

$$I(t)=\mathrm{Sin}(\omega_{BB}.t+\Delta\phi_{BB}/2).\mathrm{Cos}(\theta_{RF})$$

$$Q(t)=\mathrm{Sin}(\omega_{BB}.t-\Delta\phi_{BB}/2).\mathrm{Sin}(\theta_{RF}-\Delta\phi_{RF})$$

The first step would be to vary $\theta_{RF}$ (with the DSB-SC phase shifter 53) over a range greater than $\pi/2$ and record the maximum I and Q rms levels over this range of $\theta_{RF}$.

$$I_{max}(t)=A.\mathrm{Sin}(\omega_{BB}.t+\Delta\phi_{BB}/2) \text{ at } \theta_{RF}=0$$

$$Q_{max}(t)=A.\mathrm{Sin}(\omega_{BB}.t-\Delta\phi_{BB}/2) \text{ at } \theta_{RF}=\pi/2+\Delta\phi_{RF}$$

They should be equal after the gain calibration, i.e. $I_{max}(\mathrm{rms})=Q_{max}(\mathrm{rms})=A/\sqrt{2}$ The next step is to adjust the DSB-SC phase shifter 53 so that I and Q rms signal levels are exactly equal at the same time and measure their corresponding rms levels:

$$I_{rms}=Q_{rms} \text{ i.e.}$$

$$\mathrm{Cos}(\theta_{RF})=\mathrm{Sin}(\theta_{RF}-\Delta\phi_{RF})=A_{\Delta\omega RF} \quad [\mathrm{Eqn.~3}]$$

The DSP would then normalize $I_{rms}$ and $Q_{rms}$ it to the max rms levels $I_{max}(\mathrm{rms})$ and $Q_{max}(\mathrm{rms})$ i.e. to $A/\sqrt{2}$.

$$I_{rms}/I_{rms}(rms)=\mathrm{Cos}(\theta_{RF})=A_{\Delta\phi RF}$$

$$Q_{rms}/Q_{max}(rms)=\mathrm{Sin}(\theta_{RF}-\Delta\phi_{RF})=A_{\Delta\phi RF}$$

The final step would be the DSP using the normalized level $A_{\Delta\phi RF}$ to find the corresponding IQ phase error $\Delta\phi_{RF}$ in a look-up table. The look-up table basically lists the solution of equation 3 and would be stored in an internal memory in the DSP 40.

Another different approach and embodiment is described to accomplish the systematic phase error correction.

For this correction, the receiver 41 should allow the systematic phase error $\Delta\phi_{RF}$ to be adjusted to zero (IQ relative phase adjustment in either RF path or in local oscillator path). When the systematic phase error is removed, $\Delta\phi_{RF}=0$, and from equation 3

$$\mathrm{Cos}(\theta_{RF})=\mathrm{Sin}(\theta_{RF}-\Delta\phi_{RF})=A_{\Delta\phi RF}=1/\sqrt{2} \text{ exactly.}$$

Both $\Delta\phi_{RF}$ and $\theta_{RF}$ are adjusted iteratively by the DSP to get the optimum result of $A_{\Delta\phi RF}=1/\sqrt{2}$ exactly from Equation 3.

Therefore, for a starting setting of $\Delta\phi_{RF}$ first adjust the DSB-SC phase shifter 53 $\theta_{RF}$ of the calibration tone to make I and Q rms levels equal and check Equation 3 if $A_{\Delta\phi RF}=1/\sqrt{2}$ exactly. If $A_{\Delta\phi RF}=/=1/\sqrt{2}$, change the value of $\Delta\phi_{RF}$ by small increments and adjust the DSB-SC phase shift $\theta_{RF}$ again to make I and Q rms levels equal. Finally, check Equation 3 to see if $A_{\Delta\phi RF}=1/\sqrt{2}$ exactly. If not, repeat the process until $A_{\Delta\phi RF}=1/\sqrt{2}$ exactly.

Using this method, the systematic IQ phase error can be calibrated by the DSP 40 independently of the frequency dependent IQ phase error.

As described in the Background of Invention section, frequency dependent IQ phase errors must also be calibrated and corrected. In another embodiment realized by the present invention, the frequency dependent IQ phase errors may be calibrated in the following manner.

The IQ phase errors due to filter errors in the base band paths (66 and 67) are computed at a frequency $F_{BB}$. For a base band calibration tone of $\mathrm{Sin}(\omega_{BB}.t)$ in the transmitter, the corresponding receiver signals are $$I_{sin}(t)=A.(1+\Delta G/2).\mathrm{Sin}(\omega_{BB}.t+\Delta\phi_{BB}/2).\mathrm{Cos}(\theta_{RF})$$

$$Q_{sin}(t)=A.(1-\Delta G/2).\mathrm{Sin}(\omega_{BB}.t-\Delta\phi_{BB}/2).\mathrm{Sin}(\theta_{RF}-\Delta\phi_{RF})$$

Where
A=constant
$\Delta G$=IQ gain imbalance in the receiver
$\Delta\phi_{BB}$=frequency dependent base band IQ phase error in the receiver, at $\omega_{BB}$
$\theta_{RF}$=total (adjustable) RF phase shift in the calibration tone path
$\Delta\phi_{RF}$=systematic IQ phase error in the receiver For a base band calibration tone of $\mathrm{Cos}(\omega_{BB}.t)$ in the transmitter, the corresponding receiver signals are $$I_{cos}(t)=A.(1+\Delta G/2).\mathrm{Cos}(\omega_{BB}.t+\Delta\phi_{BB}/2).\mathrm{Cos}(\theta_{RF})$$

$$Q_{cos}(t)=A.(1-\Delta G/2).\mathrm{Cos}(\omega_{BB}.t-\Delta\phi_{BB}/2).\mathrm{Sin}(\theta_{RF}-\Delta\phi_{RF})$$

The calibration procedure would begin with the DSP 40 adjusting $\theta_{RF}$ to approximately $\pi/4$ so that $$\mathrm{Cos}(\theta_{RF})\cong\mathrm{Sin}(\theta_{RF}-\Delta\phi_{RF})\cong 1/\sqrt{2} \text{ (i.e. I and Q signals are approximately of equal magnitude).}$$

Once this is done, a signal, $\mathrm{Sin}(\omega_{BB}.t)$ is sent as the base band calibration tone in the transmitter. The DSP then captures the corresponding IQ signals as $I_{sin}(t)$ and $Q_{sin}(t)$. Then the DSP sends $\mathrm{Cos}(\omega_{BB}.t)$ as the base band calibration tone in the transmitter, and captures the corresponding receiver I and Q signals as $I_{cos}(t)$ and $Q_{cos}(t)$ respectively, while keeping $\theta_{RF}$ constant (at approximately $\pi/4$). The time "t" is measured in different reference frame for the two cases, and t=0 i.e. start of the capture is taken after many cycles of the transmitter base band tone $\mathrm{Sin}(\omega_{BB}.t)$ or $\mathrm{Cos}(\omega_{BB}.t)$ so that any transient disturbance in the low-pass filters in both transmitter and receiver have significantly decayed. From the captured signals, the DSP computes $I_{sin}(t).Q_{sin}(t)-I_{cos}(t).Q_{sin}(t)$, preferably over multiple cycles of $\omega_{BB}$ in order to average out any noise. Equation 4 below represents this error.

$$I_{\sin}(t)\cdot Q_{\cos}(t)-I_{\cos}(t)\cdot Q_{\sin}(t)=K1\cdot[\mathrm{Sin}(\omega_{BB}\cdot t+\Delta\varphi_{BB}/2)\cdot \quad [\mathrm{Eqn.~4}]$$
$$\mathrm{Cos}(\omega_{BB}\cdot t-\Delta\varphi_{BB}/2)-$$
$$\mathrm{Cos}(\omega_{BB}\cdot t+\Delta\varphi_{BB}/2)\cdot$$
$$\mathrm{Sin}(\omega_{BB}\cdot t-\Delta\varphi_{BB}/2)]\cdot$$
$$[\mathrm{Cos}(\theta_{RF})\cdot\mathrm{Sin}(\theta_{RF}-\Delta\varphi_{RF})]$$
$$=K2\cdot\mathrm{Sin}(\Delta\varphi_{BB})\cdot[\mathrm{Cos}(\theta_{RF})\cdot$$
$$\mathrm{Sin}(\theta_{RF}-\Delta\varphi_{RF})]$$
$$=K3\cdot\mathrm{Sin}(\Delta\varphi_{BB}) \text{ i.e. constant}$$
$$\text{and dependent on } \Delta\varphi_{BB}$$

The DSP 40 then adjusts $\Delta\phi_{BB}$ in the receiver and minimizes the value of $|I_{sin}(t).Q_{cos}(t)-I_{cos}(t).Q_{sin}(t)|$ that is computed from the captured data.

Therefore once the frequency dependent errors are calibrated, they may be corrected. Usually the frequency dependent IQ phase error varies linearly with frequency, starting at 0 degrees at 0 Hz, and possibly reaching a few degrees at the band edge. This is largely due to mismatches between the cutoff frequencies of the I and Q low-pass filters. The frequency dependent IQ phase error is corrected by cascading adjustable all-pass networks 72 and 74 in the I and Q base band signal paths. These all pass networks will be under the control of the DSP 40.

Figure 5:
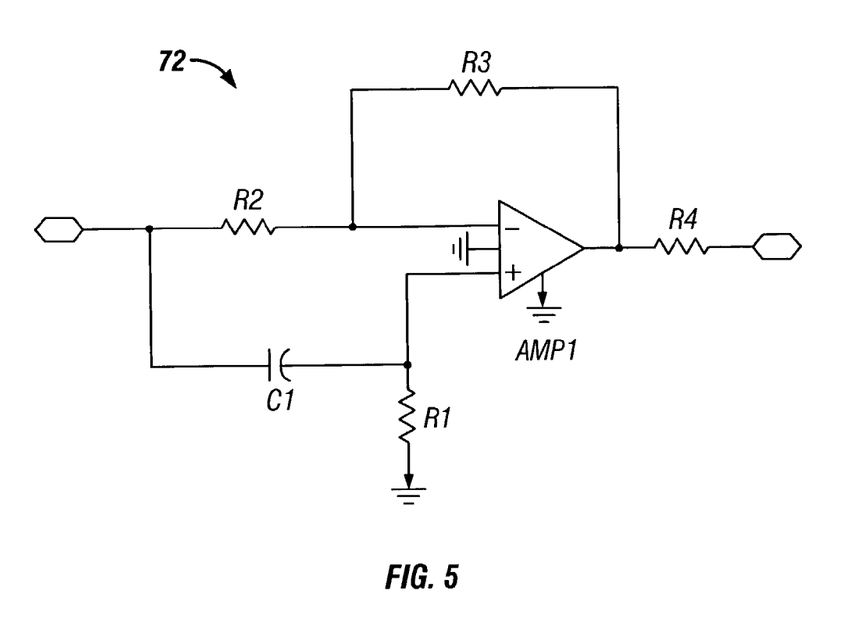
FIG. 5 shows an all pass network that may be used in a preferred embodiment of the present invention.

One such example of an all-pass network is shown in FIG. 5. This network comprises resistors R1, R2, R3 and R4, along with one capacitor C1 and 1 operational amplifier. This type of all-pass network passes signals of all frequencies with no change in gain. The use of the capacitor C1 does introduce a slight phase shift in the signal output however. This is desireable so that a relative phase mismatch between two such circuits can be introduced by setting these networks to slightly different frequencies from each other. The frequency (f0_MHz) of these networks is defined as f0_MHz=$(2\pi R1.C1)^{-1}$ where R1 is in ohms and C1 is in microfarads. Producing a phase mismatch between the all-pass networks allows for IQ phase error compensation as described below.

Figure 6:
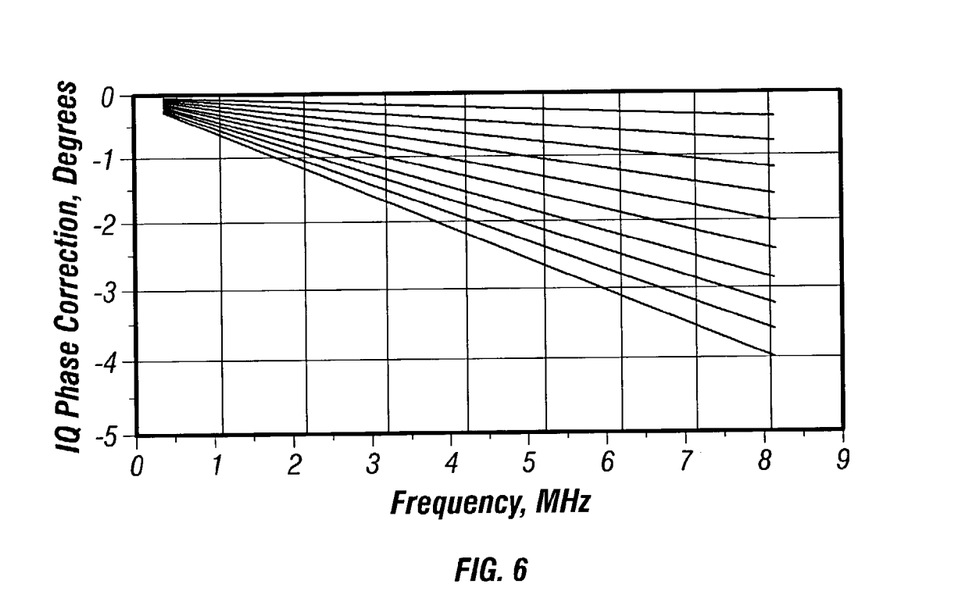
FIG. 6 shows a graph of phase angle versus frequency for the all pass network.

The relative phase mismatch response between two such networks is shown in FIG. 6 for various relative frequency mismatches. This graph shows networks that are centered around a nominal value of 20 MHz. For example, a 10% mismatch between the two circuits implies that the nominal f0_MHz values are 19 and 21 MHz for the two networks respectively. R1 and/or C1 of each network is adjusted to introduce a relative frequency mismatch that results in a particular $\Delta\phi_{BB}$ IQ phase mismatch at a particular $F_{BB}$ (see FIG. 6). The DSP 40 adjusts R1 and/or C1 in the receiver all-pass networks and minimizes the value of $|I_{sin}(t).Q_{cos}(t)-I_{cos}(t).Q_{sin}(t)|$ that is computed from the captured data. In this manner the frequency dependent IQ relative phase error is corrected within the transceiver. The largely linear variation of this error over the frequency range allows for I and Q phase errors to be corrected. For example, if the I and Q branches are 85 degrees out of phase, the all-pass network frequencies are adjusted by the DSP 40 to provide an extra 5 degrees of shift to provide true quadrature signals (i.e. 90 degree separation). Further, when performed at a base band frequency $F_{BB}$, this inherently ensures that the phase error will be smaller at lower frequencies.

The advantage of using all-pass networks is that they do not introduce any frequency dependent IQ gain imbalances that other networks like low-pass filters etc suffer from. Therefore any phase error produced in the RF path may be compensated for by the frequency adjustments of the all-pass networks 72 and 74, by the DSP 40.

The present invention therefore both determines and corrects automatically the systematic gain and phase errors, and the frequency dependent phase errors common to IQ quadrature transceivers. As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for maintaining a desired phase imbalance of 90 degrees between in-phase and quadrature components of a received signal comprising the acts of:
    generating an RF tone in a transmitter path by applying a DC signal, the RF tone being used to produce a modulated signal, the modulated signal having a phase angle,
    adjusting the phase angle to determine a peak amplitude for the in-phase component of the received signal;
    adjusting the phase angle to determine a peak amplitude for the quadrature component of the received signal;
    adjusting the phase angle to set the amplitudes for the in-phase and quadrature components of the received signal to be approximately equal during transmission,
    determining if the desired phase imbalance of 90 degrees has been achieved based on an analysis of the in-phase and quadrature components that have the approximately equated amplitudes; and
    adjusting a second phase angle to achieve the desired phase imbalance of 90 degrees if the desired phase imbalance of 90 degrees has not been achieved wherein the second phase angle is adjusted based on results of the analysis.

2. The method of claim 1, wherein the second phase angle is adjusted by using a look-up table.

3. The method of claim 2, wherein the lookup table contains mathematical solutions to an equation.

4. The method of claim 3, wherein the second phase angle is adjusted iteratively by a digital signal processor.

5. The method of claim 3, further comprising the act of coupling the double side band suppressed carrier signal to a receiver's RF path at a low noise amplifier input terminal.

6. A communications device for correcting imbalance between in-phase and quadrature components of a signal comprising:
    a first mixer to multiply a low frequency signal and high frequency signal to produce a double side-band suppressed carrier signal, the high frequency signal being generated in a transmitter path by applying a DC signal,
    a second and third mixer to produce I and Q branches of the received signal from the double side-band suppressed carrier signal; and
    a digital signal processor that corrects the imbalance via a calibration and a correction mode wherein the calibration and correction modes involve manipulating the I and Q branches during transmission.

7. The communication device of claim 6, further compromising a means to couple the double side band suppressed signal to the communications devices's RF path at a low noise amplifier input terminal.

8. The communication device of claim 6, wherein the digital signal processor varies the phases of the I and Q signal to determine a gain adjustment.

9. The communication device of claim 8, wherein the digital signal processor changes the signal levels of the I and Q branches so that they are equal to each other.

10. The communication device of claim 9, wherein the digital signal processor enacts the correction mode after the calibration mode.

11. The communication device of claim 10, wherein the digital signal processor accesses a look-up table to correct for a phase error imbalance between the I and Q branch signals.

12. The communication device of claim 10, wherein the digital signal processor iteratively adjusts the phase difference between the I and Q branch signals until there is no phase error.

13. A method for correcting imbalance between in-phase and quadrature components of a received signal comprising the acts of:
producing I and Q branch calibration signals of a DSB-SC signal, the DSB-SC signal being produced from an RF tone generated in a transmitter path by applying a DC signal, wherein the I branch signal is represented by: $I(t)=A \cdot (1+\Delta G/2) \cdot \sin(\omega_{BB}t+\Delta\phi_{BB}/2) \cdot \cos(\theta_{RF})$, and the Q branch signal is represented by: $Q(t)=A \cdot (1-\Delta G/2) \cdot \sin(\omega_{BB}t-\Delta\phi_{BB}/2) \cdot \sin(\theta_{RF}-\Delta\phi_{RF})$;
varying the gains of the I and Q branches until $\Delta G=0$;
varying $\theta_{RF}$ over a range greater than $\pi/2$ and record the maximum I and Q signal levels over this range of $\theta_{RF}$;
adjusting a DSB-SC phase shift of the DSB-SC signal during transmission so that I and Q signal levels are exactly equal at the same time and measure a corresponding rms level of each I and Q signal level so that $\cos(\theta_{RF})=\sin(\theta_{R}-\Delta\phi_{RF})=A_{\Delta\phi.RF}$;
using the measured level of $A_{\Delta\phi.RF}$ to find the corresponding IQ phase error $\Delta\phi_{RF}$ in a look-up table; and
shifting a relative phase between the in-phase and quadrature components of the received signal to be 90 degrees, by adjusting the phase error based on the amount stored in the look-up table.

14. The method of claim 13, wherein a digital signal processor varies the gains of the I and Q branches.

15. The method of claim 13, wherein the I and Q branch signals are produced by calibration tones.

16. The method as recited in claim 15 wherein the calibration tone is a double side band suppressed carrier signal.

17. The method of claim 13, wherein a digital signal processor controls a phase shifter to vary $\theta_{RF}$.

18. The method of claim 17, wherein the digital signal processor controls a second phase shifter to adjust $\Delta\phi_{RF}$ as determined from the look-up table.

19. A radio transceiver comprising:
an antenna;
a quadrature receiver for receiving signals and converting the received signals into in-phase baseband and a quadrature baseband signals;
a digital signal processor for performing the following tasks:
generating an RF tone in a transmitter path by applying a DC signal, the RF tone being used to produce a modulated signal, the modulated signal having a phase angle,
determining an imbalance in the quadrature receiver between the in-phase and quadrature baseband signals of the received signal under varying conditions,
adjusting the phase angle to determine a peak amplitude for the in-phase signal of the received signal;
adjusting the phase angle to determine a peak amplitude for the quadrature signature of the received signal;
adjusting the phase angle to set the amplitudes for the in-phase and quadrature signals of the received signal to be approximately equal during transmission;
determining if a desired phase imbalance of 90 degrees has been achieved based on an analysis the in-phase and quadrature signals that have the approximately equated amplitudes; and
adjusting a second phase angle to achieve the desired phase imbalance of 90 degrees if the desired phase imbalance of 90 degrees has not been achieved wherein the second phase angle is adjusted based on results of the analysis.

* * * * *